March 24, 1931.  A. G. McKEE  1,797,271
GAS SCRUBBER
Filed Dec. 21, 1925  2 Sheets-Sheet 1

Inventor
Arthur G. McKee
By Richey Watts
Attorney

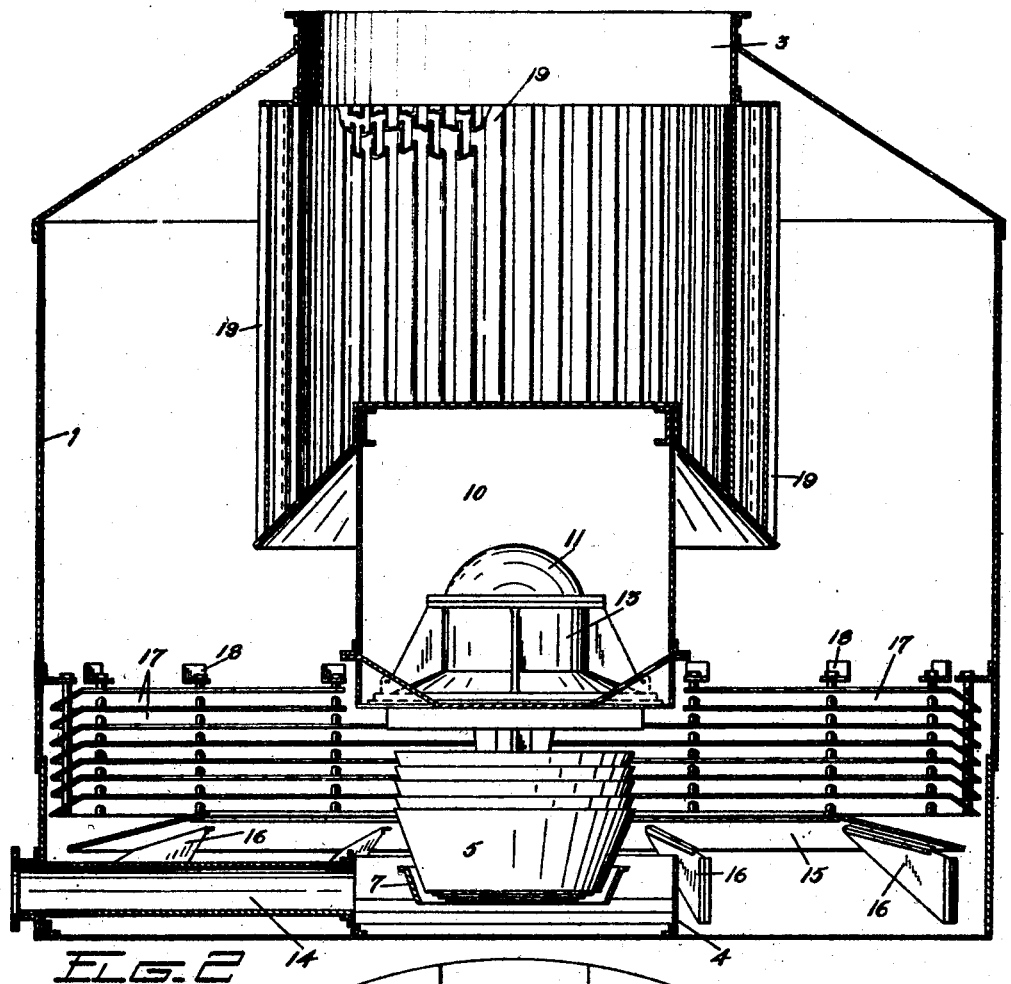
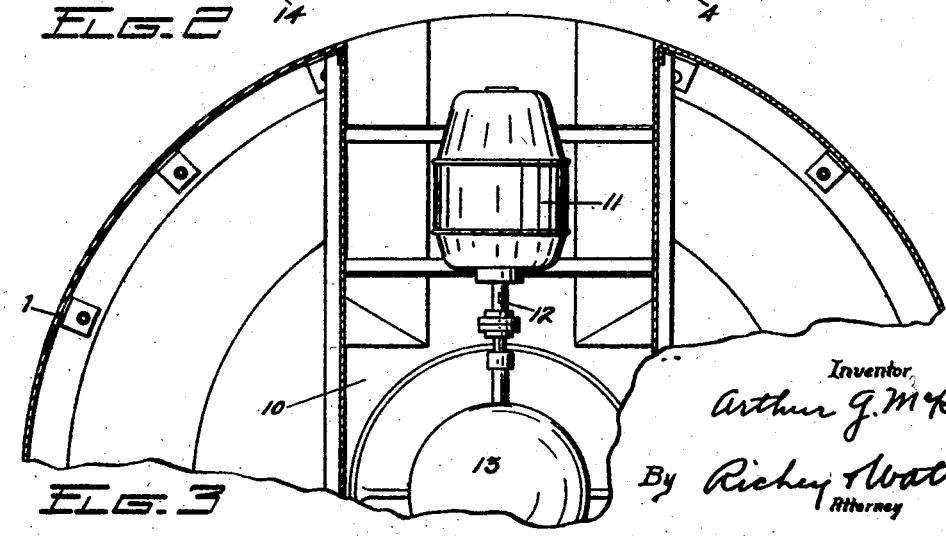

Patented Mar. 24, 1931

1,797,271

UNITED STATES PATENT OFFICE

ARTHUR G. McKEE, OF CLEVELAND, OHIO

GAS SCRUBBER

Application filed December 21, 1925. Serial No. 76,630.

This invention relates to gas scrubbers and is more particularly concerned with gas scrubbers of the type in which the gases to be cleaned and cooled are passed through liquid in spray form.

The invention also relates to a gas scrubber provided with means for preventing the treated gases from carrying liquids out of the scrubber. It also relates to a new and improved apparatus for efficiently cooling gases after the cleaning operation. It further relates to apparatus for removing solid materials still retained by the heated gases after the treatment of the gases with the liquid spray.

I have discovered that when gases are treated in scrubbers of the type in which the gases pass through one or more liquid sprays and particularly scrubbers of the type illustrated in my copending application, Serial No. 40,748, filed July 1st, 1925, which matured into Patent No. 1,748,723 on Feb. 25, 1930, the gases tend to pick up and entrain a considerable amount of liquid in finely divided form and hence pass from the scrubber with an unnecessarily high moisture content. By my present invention I have provided means by which this high moisture content may be considerably reduced.

In scrubbers of the type above described I have also discovered that the final cooling of the gases, after the solid material has been removed therefrom by liquid spray, may be efficiently affected and the temperature reduced to merely that of the cooling liquid if only fresh, cooled liquid is used as the final cooling medium. Accordingly, my present invention also includes means for forming a liquid spray composed of fresh, cool liquid as a final cooling spray through which the gases pass just prior to leaving the scrubber.

I have also discovered that even though gases have been treated with a plurality of liquid sprays, some solids are often retained by the gases unless mechanical means are employed for removing such substances. Accordingly, I have provided mechanical means interposed in the pathway of the outgoing gases which are adapted to remove solids from the treated gases and return the same to the lower parts of the scrubber.

In the drawings accompanying and forming a part of this application:

Fig. 2 is an enlarged detail view of the top portion of the scrubber shown in Fig. 1; and Fig. 3 is a sectional view taken substantially on line 3—3 of Fig. 1, certain parts having been broken away.

Figure 1:
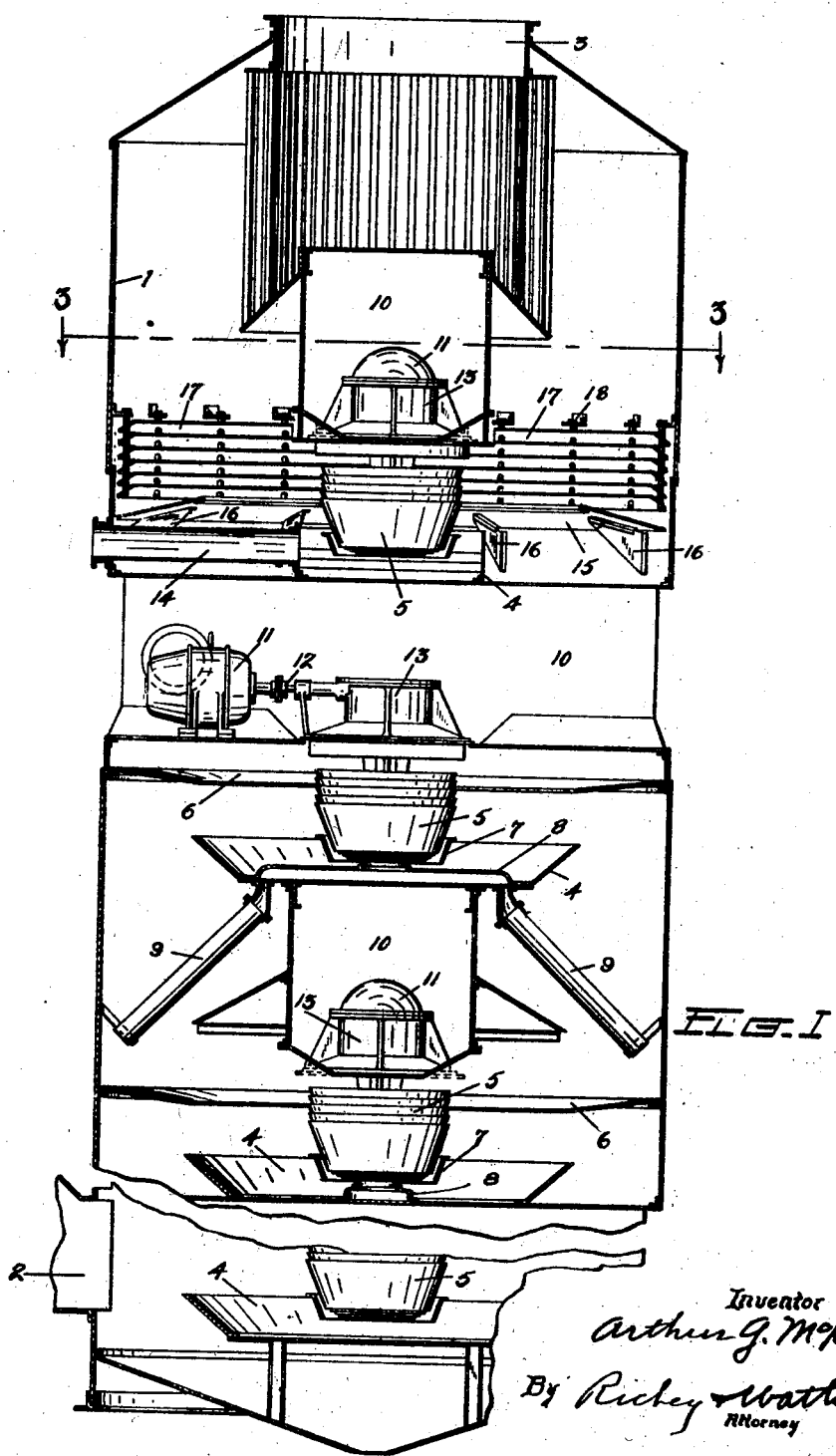
Fig. 1 is a central, vertical section through a scrubber embodying my invention, parts of the scrubber being broken away.

One form of scrubber involving my invention is disclosed in the figures, in which is shown an upright tower or casing 1, which may be constructed of sheet metal parts suitably welded or otherwise secured together. A gas inlet 2 is provided near the bottom of the tower or casing 1, through which blast furnace gases, or other gases carrying solid material may enter the casing. The top of the tower 1 is provided with a gas outlet opening 3.

The interior construction of the scrubber is, in most respects, substantially the same as that shown in my above mentioned application. It may briefly be described as follows: Within the casing or tower 1 is provided a plurality of gas-treating compartments each comprising a liquid holding receptacle or pan 4, a pump 5 of conical or other design positioned to dip into the water in the pan 4 and adapted to elevate and spray the water outwardly toward or into contact with the side walls of the casing 1; and a ledge 6 extending from the casing inwardly, or other suitable means, to return the sprayed liquid back to the pan 4. It will be understood that the gases which enter through the opening 2 may flow or pass upwardly through the tower between the pans 4 and ledges 6 and through the sheets of liquid spray formed by the pumps 5. Solid materials are removed from the gases by the liquid spray and are gradually carried to the lower portion of the scrubber where they may be removed when and as desired, the means for removing this solid material not being shown in the present application.

Each pan 4 is preferably provided with a stationary ring 7 closely surrounding the pump 5 for the purpose of diminishing the amount of liquid in the pan which would be given a rotary motion by the rotation of the pump 5, and is also provided with a member 8, preferably in the form of a casting open at the top and also at the bottom through which liquid may be withdrawn from the pan 4 and discharged by way of pipes 9 into contact with the side walls of the tower 1 adjacent to the ledge 6 of the gas-treating compartment next therebelow. It will be understood that when the level of the water in the pan 4 rises above the top of the central opening in the casting 8 it will overflow thereinto and then pass out through pipes 9.

The scrubber 1 is provided with a plurality of work passages 10 extending inwardly from one side to beyond the center, and preferably entirely through the scrubber, as shown in Fig. 1. In each work passage is disposed a motor 11 or other pump-actuating means connected to the adjacent pump 5 by a suitable shaft 12 and gearing (not shown) disposed within the housing 13 which housing serves to suspend the pump 5 within the gas-treating chamber below the passage. With the exception of the topmost and bottommost pans 4, the several pans and gas-treating compartments in the scrubber or tower 1 are alike in substantially all respects. The lowermost pan is preferably not provided with the member 8 and pipes 9 while the uppermost pan is neither provided with an overflow member such as 8 nor with a ledge corresponding to ledges 6 to return sprayed liquid to the pan 4.

Referring now more particularly to Figs. 2 and 3, the topmost pan 4 is shown as being connected directly to a liquid inlet tube 14 which supplies fresh, cool liquid to the pan. The pump 5 when rotated will elevate liquid from the pan 4 and spray it outwardly toward the side walls of the scrubber or tower 1 usually in a curved path. A ledge 15 carried by the side walls of the tower 1 and supported by any suitable means, for example brackets 16, corresponds in general size to the ledges 6, but, in contrast therewith, is inclined downwardly and outwardly so that liquid falling on the top thereof will be directed toward the side walls of the tower 1 and will flow downwardly into the next lower pan and not be returned to the topmost pan 4. By means of this ledge 15 the fresh, cool liquid coming into pan 4 is sprayed outwardly only once by the topmost pump 5 and hence exerts the maximum cooling effect on the gases since its temperature is lower than would be the case if this liquid were returned to the topmost pan 4 through the heated gases or the fresh, cool liquid were first mixed with previously sprayed and heated liquid.

The pumps 5 are of such construction and are operated at such speed that the liquid sprayed outwardly therefrom strikes the side walls of the tower 1. The sprayed liquid which is in fairly large globules prior to striking against the wall of the tower 1 is to some extent broken up by such impact, into fine particles of a size to form a fine mist. While formation of this mist may be desirable in the lower parts of the tower, it is particularly desirable that its formation be avoided in the topmost spraying stage zone or gas-treating compartment of the scrubber, since otherwise the outgoing gases will carry with them an undue and undesirable amount of moisture. Accordingly, I have provided means associated with the topmost spray-producing means for decreasing the amount of mist formed and for preventing such finely divided liquid or mist as is formed therein from being carried away by the outgoing gases. This means may, of course, assume different forms but, as shown herein, it comprises one or more plates 17 preferably shaped like truncated hollow cones with the larger end downward, disposed preferably at an acute angle to and in the trajectory of the liquid spray from the pump 5 and between the pan 4 and the side walls of the scrubber or casing 1 by which walls they may be carried. Each of the plates 17 is preferably spaced a small distance from or is maintained out of substantially continuous contact with the side wall so as to permit liquid flowing downwardly on the plates to continue on down along the side wall without obstruction. The plates 17 may obviously extend for various distances inwardly from the side wall 1, but I have found that satisfactory results have been obtained in a scrubber of about eighteen feet in diameter when the plates 17 are about a foot or less in width along the diameter of the scrubber. The liquid sprayed by the pump 5 may, and presumably does in large part, strike the lower surfaces of plates 17 at an acute angle and flows toward the casing 1 in large globules or small streams. Plates 17 are preferably so spaced and disposed at such an angle that none or but very little of the spray impinges directly on the shell 1 without first hitting one of the plates 17 and thus prevents the spray breaking up into finely divided, or mist-like particles. The plates 17 thus prevent the formation of large quantities of mist and as the spray entrains and carries with it practically all of the mist from the gases rising from the lower chamber the gases which eventually rise above the topmost zone of liquid spray are in a condition which is relatively dry as compared with gases issuing from similar devices prior to my invention and with which I am familiar.

As the gases are usually saturated with liquid vapor at a comparatively high temperature and then cooled in their passage through the scrubber, it is found that nearly every particle of solid matter is a nucleus around which a minute drop of liquid is formed by the condensation of the liquid.

Inasmuch as a certain amount of solid material with the liquid adhering thereto is retained by the ascending gases, and carried above all of the liquid screens, such solids have heretofore been for the most part carried out of the scrubber with the outgoing gases. I have, however, provided mechanical means for removing a large part of the last remaining solids from the outgoing gases, this means being so constructed as to cause reversals of the direction of flow of the outgoing gases. As illustrated herein this means consists of a plurality of channel-shaped plates or channels 19 suspended from the top of the scrubber and extending down to about or below the top of the top work passage 10. These plates or channels 19 are preferably spaced apart and arranged in staggered relation and in two or three rows so that the gases come first into contact with the inner side of the channel and then must reverse their direction before passing between the channels. The solids carried by the gases will impinge upon the surfaces of the channels, when the gases change direction suddenly in passing in their tortuous paths between the channels. On account of the adhering liquid, the solids and liquids remain on the surfaces of the channels 19 and flow down along them to the lower parts of the scrubbers where they unite with the large volume of liquid with which they ultimately pass out of the scrubber.

Having thus described my invention so that those skilled in the art may be enabled to practice the same, what I desire to secure by Letters Patent is described in what is claimed, it being understood that various changes not amounting to invention may be made in the details of construction herein shown and described without departing from the spirit of my invention.

What is claimed is:

1. A gas scrubber comprising a casing through which gases may freely pass in a vertically upward direction, means for forming zones of liquid spray across the path of gases through the casing, and means in the last said zone through which the gases travel before leaving the casings for preventing the formation of mist by the sharp impact of the spray on any surface.

2. A gas scrubber comprising a casing through which gases may flow, means for spraying liquid toward the walls of the casing and across the path of flow of gases within the casing, and downwardly and outwardly inclined mist formation preventing means disposed in the path of the sprayed liquid and adjacent to the walls of the casing for directing liquid to the walls of the casing without sharp impact on any surface.

3. A gas scrubber comprising a casing, through which gases may flow, a liquid holding receptacle in the casing, means for spraying liquid from the receptacle toward the walls of the casing and stationary downwardly and outwardly inclined, mist formation preventing means interposed between the means for spraying liquid and the walls of the casing in the path of the sprayed liquid.

4. A gas scrubber comprising a casing through which gases may flow, a liquid holding receptacle within the casing, means for spraying liquid across the path of flow of gases in the casing and from the receptacle toward the side walls of the casing, and a downwardly and outwardly inclined wall adjacent to the side walls of the casing in and extending to above the path of the sprayed liquid for deflecting sprayed liquid to the sides of the casing without substantial mist formation after the spray has traversed the major portion of the path of gas flow.

5. In a gas scrubber, in combination, a casing through which gases may flow, means within the casing for maintaining a liquid spray across the path of gases passing through the casing, said casing being substantially unobstructed to vertical flow of gas above said spray maintaining means, and means for gently deflecting the spray downward to the casing without sharp impact after the sprayed liquid has traversed the major portion of the path of the gases.

6. In a gas scrubber, in combination, a casing through which gases may flow, means within the casing for maintaining a liquid spray across the path of gases passing through the casing, and means for directing the spray to the casing without sharp impact on any surface.

7. A gas scrubber comprising a casing through which gases may pass, means for forming zones of liquid spray across the path of gases in the casing, and a plurality of outwardly and downwardly inclined plates in the last said zone through which the gases pass before leaving the casing for directing the spray to and down the side walls of the casing without sharp impact and in a manner to prevent the formation of mist after the spray has passed through the major portion of the gas.

8. A gas scrubber comprising a casing having a plurality of vertically arranged gas treating chambers through which gases may pass, means in each said chamber for forming liquid spray across the path of flow of gases in said chamber, and inclined walls extending upwardly and inwardly from and adjacent to the side walls of the topmost of said vertically arranged chambers for directing the liquid sprayed in said topmost chamber down to the next gas treating chamber therebeneath.

9. In a gas scrubber in combination, a casing through which gases may flow, means for forming a plurality of vertically spaced apart sprays of liquid across the path of flow of gases in the casing, and means for directing the topmost spray of liquid to and down the side walls of the casing, after said topmost spray has crossed the major part of the path of gas flow, without abrupt change in direction or sharp impact.

10. A gas washer comprising a casing through which gases may pass, means for forming zones of liquid spray across the path of gases through the casing, and means in the last said zone through which the gases travel before leaving the washer for preventing the formation of mist by the impact of the spray on the casing, the last said means comprising a wall disposed in, and downwardly and outwardly inclined at an acute angle to, the path of the liquid spray and adjacent to but disposed out of continuous contact with the casing.

In testimony whereof I hereunto affix my signature this 18th day of December, 1925.

ARTHUR G. McKEE.